US012360817B1

(12) United States Patent
Sathe et al.

(10) Patent No.: US 12,360,817 B1
(45) Date of Patent: Jul. 15, 2025

(54) RECONFIGURATION OF EXECUTION ENVIRONMENT POOLS FOR SERVERLESS FUNCTIONS

(71) Applicant: Amazon Technologies, Inc., Seattle, WA (US)

(72) Inventors: Mihir Sathe, Seattle, WA (US); Aravind Srinivasan, Ellicott City, MD (US)

(73) Assignee: Amazon Technologies, Inc., Seattle, WA (US)

( * ) Notice: Subject to any disclaimer, the term of this patent is extended or adjusted under 35 U.S.C. 154(b) by 991 days.

(21) Appl. No.: 17/306,751

(22) Filed: May 3, 2021

(51) Int. Cl.
*G06F 9/50* (2006.01)
*G06F 9/455* (2018.01)
*G06F 11/30* (2006.01)
*G06F 11/34* (2006.01)

(52) U.S. Cl.
CPC ........ *G06F 9/5044* (2013.01); *G06F 9/45558* (2013.01); *G06F 11/3006* (2013.01); *G06F 11/3495* (2013.01); *G06F 2009/45575* (2013.01)

(58) Field of Classification Search
CPC .............. G06F 9/5044; G06F 11/3006; G06F 11/3495; G06F 2009/45575
See application file for complete search history.

(56) References Cited

U.S. PATENT DOCUMENTS

| | | | |
|---|---|---|---|
| 10,182,033 B1* | 1/2019 | Farhangi | H04L 43/16 |
| 10,979,493 B1* | 4/2021 | Farrugia | H04L 47/125 |
| 2012/0069032 A1* | 3/2012 | Hansson | G06F 9/45558 |
| | | | 718/1 |
| 2017/0126506 A1* | 5/2017 | Padala | H04L 41/046 |
| 2017/0169097 A1* | 6/2017 | Petri | G06F 9/46 |
| 2017/0364387 A1* | 12/2017 | Ahmed | G06F 3/067 |
| 2018/0097874 A1* | 4/2018 | Sampathkumar | H04L 41/0897 |
| 2018/0157511 A1* | 6/2018 | Krishnan | G06F 9/5061 |
| 2019/0004892 A1* | 1/2019 | Hopkins | H04L 41/147 |
| 2019/0068505 A1* | 2/2019 | Arora | H04L 67/1017 |
| 2019/0149480 A1* | 5/2019 | Singhvi | H04L 47/2483 |
| | | | 709/226 |
| 2019/0253490 A1* | 8/2019 | Du | H04L 67/1008 |

(Continued)

*Primary Examiner* — Lewis A Bullock, Jr.
*Assistant Examiner* — Kevin X Lu
(74) *Attorney, Agent, or Firm* — Knobbe, Martens, Olson & Bear, LLP

(57) ABSTRACT

Systems and methods are described for reducing performance variance of code executions on a serverless code execution system. A serverless code execution system can operate to obtain requests to invoke code and handle such requests by generating an execution environment for the code on a host computing device and executing the code within the environment. In some cases, an execution environment is poorly placed, resulting in underperformance of code executions on that environment and variance in overall performance of the code executions. The present disclosure enables a serverless code execution system to identify underperforming execution environments and to replace such environments with new environments, reducing variation in performance across execution of the code. New environments may be placed on host computing devices asynchronously, using a placement algorithm that includes additional processing relative to an algorithm that operates synchronously to code invocation.

20 Claims, 6 Drawing Sheets

(56) References Cited

U.S. PATENT DOCUMENTS

| | | | |
|---|---|---|---|
| 2019/0280945 A1* | 9/2019 | Liu | G06F 9/465 |
| 2020/0412824 A1* | 12/2020 | Liguori | H04L 67/53 |
| 2022/0058044 A1* | 2/2022 | Ono | G06F 9/5027 |
| 2023/0185628 A1* | 6/2023 | Lo | G06F 21/566 |
| | | | 718/1 |
| 2023/0188433 A1* | 6/2023 | Sundararaman | H04L 41/5022 |
| | | | 709/226 |

* cited by examiner

RECONFIGURATION OF EXECUTION ENVIRONMENT POOLS FOR SERVERLESS FUNCTIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more virtualized "sandboxes" that appear and operate as independent execution environments to users of a data center. For example, hardware virtualization can be used to provide a fully emulated hardware computing device (a "virtual machine"). Operating-system-level virtualization can enable a kernel of an operating system to provide multiple isolated user space instances (often called "containers") without requiring virtualization of the kernel. With virtualization, the single physical computing device can create, maintain, delete, or otherwise manage execution environments in a dynamic manner. In turn, users can request computer resources from a data center, including containers, computing devices, or combinations thereof, and be provided with varying numbers of virtualized resources.

Often, virtualization results in "multi-tenancy," where a single physical computing device provides virtualized environments to multiple different end users. Further, for reasons of efficiency, resources of the physical computing device are often oversubscribed, such that the resources are not strictly divided and reserved for each environment, but are instead shared among the environments according to demand for those resources. One result of multi-tenancy and oversubscription is that an individual end user lacks full control over the resources available to their virtualized environments. While a certain level of resource availability can be expected in many or most cases, edge scenarios can exist in which the resources available to a user's virtualized environment are lower than expected, leading to lower than expected performance.

DETAILED DESCRIPTION

Figure 1:
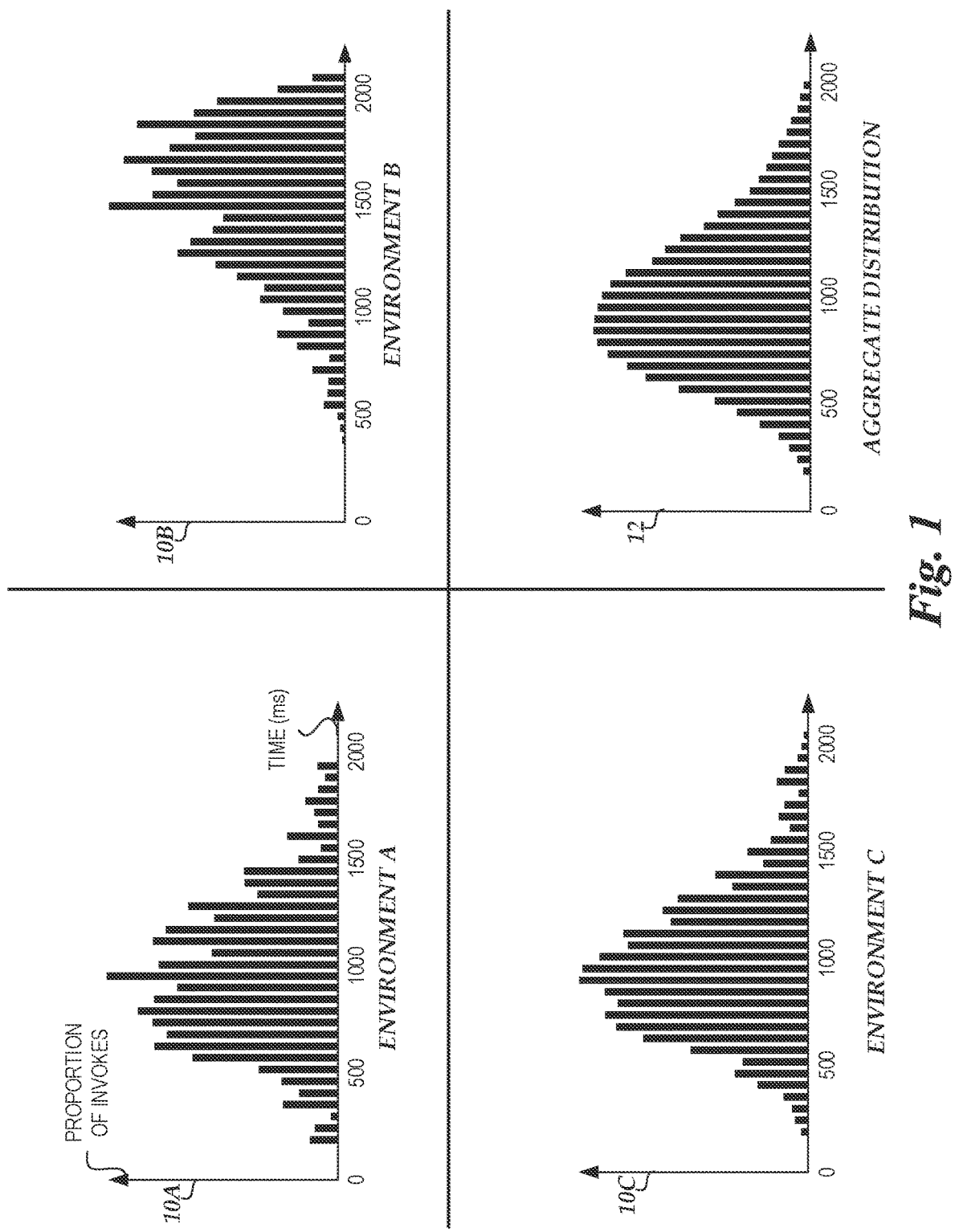
FIG. 1 is a visualization showing distributions of resource usage metrics for a task executing on different execution environments in a serverless code execution system, including a distribution of performance metrics that varies significantly from an expected distribution and indicates a potential issue on an underlying physical computing device.

Generally described, aspects of the present disclosure relate to executing code in serverless code execution systems, including redistribution of execution environments supporting code executions to minimize variance in performance. As described herein, a serverless code execution system enables rapid execution of code, which may be supplied by users of the serverless code execution system. On submitting code, the serverless code execution system can then enable the user to submit "calls" to execute the code, at which point the serverless code execution system will generate an execution environment for the code and execute the code within the environment to provide the desired functionality. The environment can then be destroyed shortly after providing the desired functionality, such that a user is responsible only for resources used during execution. These execution times are often very short, making serverless computing highly efficient, particularly for tasks with varying demand levels. However, because the serverless system (and not the end user) generally handles management of execution environments, including selection of a host device on which to place the environment, execution times may be subject to some variance dependent on the placement algorithms used by the serverless system. This variance is generally undesirable, as it may inhibit use of a serverless system for latency sensitive applications, such as user-facing systems. Illustratively, variance in execution time may be viewed as unreliability from the point of an end user. Moreover, this variance may indicate an inefficiency in the placement algorithm implemented at the serverless system, indicating that execution environments are not efficiently distributed among host devices of the system. Thus, it is desirable from both the perspective of an end user and of the system itself to minimize variance in performance of serverless code executions.

Embodiments of the present disclosure enable this variance in performance to be minimized, by providing for post hoc reconfiguration of a pool of execution environments, to replace execution environments with statistically high performance metrics with new execution environments. More specifically, a serverless code execution as disclosed herein can include a performance metric monitoring system, which determines an expected distribution of performance metrics for a given unit of code (e.g., a "task" or "function" on the serverless system). The expected distribution may reflect, for example, aggregate performance metrics for the code over a past period of time. Illustratively, the expected distribution may indicate that most invocations (e.g., an execution of the code) complete in a given amount of time (e.g., between x and y milliseconds of time). The serverless code execution can further analyze performance distributions on a per-execution environment basis, such as per-virtual machine or per-container, and identify individual environments with a performance distribution that varies from the expected by at least a threshold amount. These environments can then be replaced on the serverless system, reducing variance in performance for invocations of the code.

Variance in code performance on a serverless system can occur for a variety of reasons. As noted above, physical host devices hosting execution environments are typically oversubscribed, such that at least some resources of the device are not reserved on a per-environment basis but are instead shared among environments, such that high use of resources by one environment can starve other environments of those resources. Moreover, physical host devices are often multi-tenanted, meaning that a user associated with one environment may have no control over resources used by other environments. While load balancing techniques can be employed to attempt to balance load and maintain adequate resource availability, these techniques are often imperfect. Moreover, the nature of serverless computing can in some cases make load balancing more difficult than in other systems. For example, because serverless computing can enable end users to execute arbitrary code, the resource use of an individual item of code is typically not known before execution of that code. Moreover, this resource use can change in sometimes unpredictable ways, limiting the use of historical resource usage data. For example, code may operate responsive to an external network object not under control of the serverless system, with the resources used varying depending on a state of the object. Thus, code run a first time with the object in one state may use significantly different resources than code run a second time with the object in another state. Additionally, the resources used by a code execution may not be stable within a single execution of the code. For example, code executing over a period of a few minutes may use one level of resources at minute one and another level of resources at minute two. Thus, even if aggregate (e.g., average) resource usage would not cause resource scarcity, such scarcity can occur for smaller timeframes during execution if multiple executions attempt to use high levels of resources at the same time.

Further complicating load balancing on a serverless system is a typical desire to provide for rapid execution. One key benefit of serverless systems to many users is an ability to quickly execute their code without managing server infrastructure. This desire for quick execution often leads to a desire (on the part of the provider of the serverless system) to minimize overhead associated with beginning code execution, including overhead related to placement of a code execution on a physical host, creation of an execution environment, etc. Accordingly, load balancing algorithms that attempt to place an execution—to locate a host device in which to conduct execution—often trade off accuracy for speed, attempting to make as good a placement decision as possible within a limited period of time, rather than attempting to make the "best" possible placement. For example, a placement algorithm may employ a "best of k" approach, in which the algorithm considers placement among k randomly-selected host devices, rather than all possible host devices. This approach can significantly reduce placement decision times (as k is typically selected to be much smaller than the total number of host devices), but can reduce placement accuracy relative to considering large numbers of potential hosts.

The desire for speed in execution on serverless systems further hampers attempts to correct for suboptimal placement. One potential mechanism for correction might be to relocate executing code to another physical host, such as by migrating the execution environment between hosts. However, the migration process uses resources, and may slow down overall execution of code more than simply allowing the code to complete on an overloaded host. This is particularly true of shorter executing functions (e.g., those that complete in milliseconds, seconds, or minutes, as opposed to hours or days), which can be common on serverless systems. Thus, migration of executing code to correct for placement problems may be undesirable or not feasible in serverless code execution systems.

Even when migration costs are discarded, other issues often preclude migration of individual code executions. For example, the same variation in resource usage among code executions that inhibits initial placement can also inhibit migration, as it is unclear whether a delay in an individual code execution is due to normal execution of the code (e.g., due to increased processing as a result of external changes), temporary resource constraints (e.g., a transient reduction in computing resources on a host), or persistent problems. Accordingly, attempting to re-locate individual code executions is likely to result in unsatisfactory performance, incurring high migration costs for little or no benefit.

Embodiments of the present disclosure address the above-noted problems by providing for reshaping of a pool of execution environments for code execution, removing execution environments with statistically lower performance metrics than expected among the pool and replacing those environments with new environments on a serverless code execution system. Specifically, as disclosed herein, a serverless code execution system may monitor performance metrics for each execution environment associated with an item of code, and use aggregate metrics among those environments to determine an expected range of performance for the environments. The system may then compare the metrics for each environment to the expected range, to identify environments with lower than expected performance. The system may then replace the underperforming environments with new environments, such that new code executions occur within the new environments rather than the underperforming environments. In this manner, overall performance of code executions can be shaped to maintain consistent performance and reduce variability in that performance.

Notably, the techniques described herein differ from migration, in that data need not be transferred from an underperforming environment to a replacement environment. Serverless executions are typically stateless, meaning that state information is not guaranteed to persistent within an environment between executions. Accordingly, rather than attempt to transfer information from an underperforming environment, a serverless system can simply create a wholly new environment for a code execution, and cause new invocations of the code to occur within the new environment. As a result, migration does not increase load on underperforming environments. Moreover, this reshaping technique does not require individual executions to be relocated. Rather, new executions are directed to new environments. As a result, individual executions do not incur delays due to migration.

Yet another benefit of the techniques described herein is that replacement of underperforming environments need not be based on metrics for an individual execution, but can instead be based on aggregate statistical measures across a number of executions. For example, a distribution of task execution times for an individual environment can be compared to an expected distribution for those times. The environment can then be replaced and removed if the per-environment distribution differs from the expected distribution by a threshold amount. Thus, the techniques used herein can address variability in performance of individual executions.

Still another benefit of the present disclosure is that replacement may occur asynchronously to individual invocations of code. "Asynchronous," in this context, refers to a placement decision that is not required to satisfy an individual request to execution code. A "synchronous" decision, in contrast, is one required to satisfy an individual request. Many load balancing techniques are synchronous, in that they are invoked when an individual request to conduct an operation is received, and a load balancing decision must be made to satisfy that request. As noted above, some placement techniques used by a serverless system may be designed specifically to operate with low latency, as they are often invoked synchronously to satisfy an individual request to execute code. For example, a serverless system may operate to obtain a request to execute code, determine that no existing environment is available to satisfy that request, and make a placement decision as to where to locate a new environment to satisfy that request. Because the environment must be placed before the request is satisfied, the placement decision is considered synchronous and can be optimized for low latency. The placement decisions made with respect to a replacement environment, in contrast, can be asynchronous. For example, when a serverless system decides to replace an underperforming environment with a new environment, the underperforming environment can nonetheless continue to operate to execute code. Accordingly, creation of the new environment is not required to satisfy an individual invocation of the code, and a placement decision as to the new environment can therefore be considered less latency sensitive than a placement decision that is synchronous with respect to invocation of code. As a result, the algorithm used to make a placement decision for a new, replacement environment may be modified to increase accuracy at the expense of increased latency. For example, where a placement algorithm uses a "best of k" approach, the value of k might be increased for asynchronous placement decisions relative to synchronous placement decisions, resulting in more balanced placement. As a result, replacement environments may be less likely to underperform than those environments created as a result of synchronous placement decisions. Accordingly, reshaping of a pool of environments for code execution in the manner described herein can result in more efficient use of resources on the serverless system, reduced variation in performance, and increased reliability.

As will be appreciated by one of skill in the art in light of the present disclosure, the embodiments disclosed herein improve the ability of computing systems, such as serverless compute systems, to efficiently and reliably support code executions. Moreover, the presently disclosed embodiments address technical problems inherent within computing systems; specifically, the inherent limitations of computing resources available to support executions and the difficulties in making accurate placement decisions within distributed systems under latency-sensitive conditions. These technical problems are addressed by the various technical solutions described herein, including the automated reconfiguration of pools of execution environments supporting code executions based on statistical analysis of performance metrics for such environments, and replacement of underperforming environments. Thus, the present disclosure represents an improvement on serverless code execution systems and computing systems in general.

The foregoing aspects and many of the attendant advantages of this disclosure will become more readily appreciated as the same become better understood by reference to the following description, when taken in conjunction with the accompanying drawings.

FIG. 1 is a visualization showing distributions of resource usage metrics for a task executing on different execution environments in a serverless code execution system, including a distribution of performance metrics that varies significantly from an expected distribution and indicates a potential issue on an underlying physical computing device. As discussed above, these statistical views of performance metrics can be used in accordance with embodiments of the present disclosure to identify underperforming execution environments and replace those environments with new environments, thus reducing variation in performance of code executions on a serverless system.

In FIG. 1, performance distributions 10A-C for three execution environments (A-C) associated with a given item of code (e.g., a "task" or "function") are shown. Also shown is an aggregate performance distribution 12 for the function, representing an aggregate of performance metrics for the three environments and potentially others on a serverless code execution system. While distributions for three environments are shown, one skilled in the art will appreciate that a function may be associated with hundreds or thousands of environments on a serverless code execution system. Each environment illustratively represents an isolated execution space for code execution, such as a container or a virtual machine. Each environment is thus hosted on an underlying physical computing device (a "host"), and uses resources of that host to execute the code corresponding to the function. As a result of resource constraints and normal variation in execution times, different executions of the function take differing amounts of time. These times are shown within the distributions of FIG. 1.

More specifically, each distribution of FIG. 1 plots execution times of individual code executions relative to a proportion of executions with that time. In FIG. 1, execution time is measured as "wall clock" time, the total real time required to execute. In some embodiments, other performance metrics may be used, such as processor time (the number of processing cycles on a CPU or other processor used by the execution, such as a graphical processing unit (GPU), tensor processing unit (TPU), or other processor), memory usage (e.g., including random access memory (RAM), persistent memory provided by data storage devices, etc.), bandwidth usage (e.g., over a telecommunications network, data transmission bus, etc., which usage may be measured as operations per second, volume of data transmitted per second, etc.), or the like. In some instances, execution time (e.g., as measured by wall clock time) may be generally representative of overall performance of a function, as lack of any individual resource needed to support execution (e.g., lack of memory, bandwidth, etc.) may be expected to increase execution time.

By review of the distributions in FIG. 1, characteristics of execution of the function can be seen. For example, the aggregate distribution 12 generally shows a skewed Gaussian ("normal") distribution, such that most executions of the function complete in between 500 and 1500 milliseconds, with a median execution time of under 1000 milliseconds. This aggregate distribution 12 can represent an expected performance of the function. That is, one may expect that performance of function executions on any individual execution environment would be similar to the aggregate distribution 12. One skilled in the art will appreciate that the specific performance metrics shown in FIG. 1 are merely for illustrative purposes and may not be reflective of performance of any individual function in practice.

The statistical performance of function executions on each environment can then be compared to the expected performance by comparison of the environment's distribution 10 with the aggregate distribution 12. For example, one can see that the distributions 10A and 10C (of environment A and C, respectively) are generally similar to the aggregate distribution 12, with a median value falling around or under 1000 milliseconds. In contrast, the distribution 10B varies more significantly from the aggregate distribution 12, with a median value above 1000 milliseconds and higher skew towards large execution times.

The significant deviation of the distribution 10B from the expected distribution 12 may indicate an issue with an underlying device hosting the environment B. For example, other code executions on the device may be consuming excess resources, starving executions of the immediate function on the environment of resources. Alternatively (or additionally) there may be a malfunction in the device or other issue, such as incompatibility between the function's code and the devices' configuration, that results in poor performance of the function when executed in environment B. Moreover, function executions may be distributed among environments A-C (among others) without control by an end user. As a result, execution times for the function may appear to an end user to be variable, with most executions completing quickly, while others take significantly longer. This variation results in lower efficiency on the serverless code execution system (as the function would likely execute more efficiently in another environment) and reduced reliability from the point of view of the end user (as the end user cannot rely on the system to provide consistent and rapid executions).

In accordance with embodiments of the present disclosure, a serverless code execution system may therefore, on detecting a function environment with performance metrics differing significantly from the expected metrics, modify a pool of environments for the function to remove the underperforming environment and replace it with a new environment, potentially one selected according to a modified placement algorithm due to the asynchronous nature of the placement decision. The system may then redirect function invocations to the new replacement environment, and remove the underperforming environment from the pool. The new, replacement environment can be expected to have performance metrics similar to the expected performance metrics for all of the function's environments. Accordingly, by reconfiguration of the environment pool, the efficiency and reliability of execution of the function on the serverless system is improved.

While some embodiments are described with reference to underperforming execution environments, the techniques described herein may additionally or alternatively be applied to over-performing environments (e.g., those with a performance metric that is significantly better than expected). While over-performance may not individually be problematic, there may be instances in which it is problematic for a serverless function or serverless system overall. For example, over-performance may indicate that an execution is accessing more than a "fair share" of resources on a host, which may result in bottlenecks or underperformance for other executions on the host. Even if this is not occurring, over-performance may undesirably increase variance in execution time for a serverless function. End users may prioritize minimal variation, for example such that every execution occurs within roughly the same amount of time, as this may aid in tracking, planning, debugging, etc. Thus, the techniques described herein may be applied to over-performing environments in order to remove those environments from a pool associated with a function, minimizing variance in performance of the function.

Figure 2:
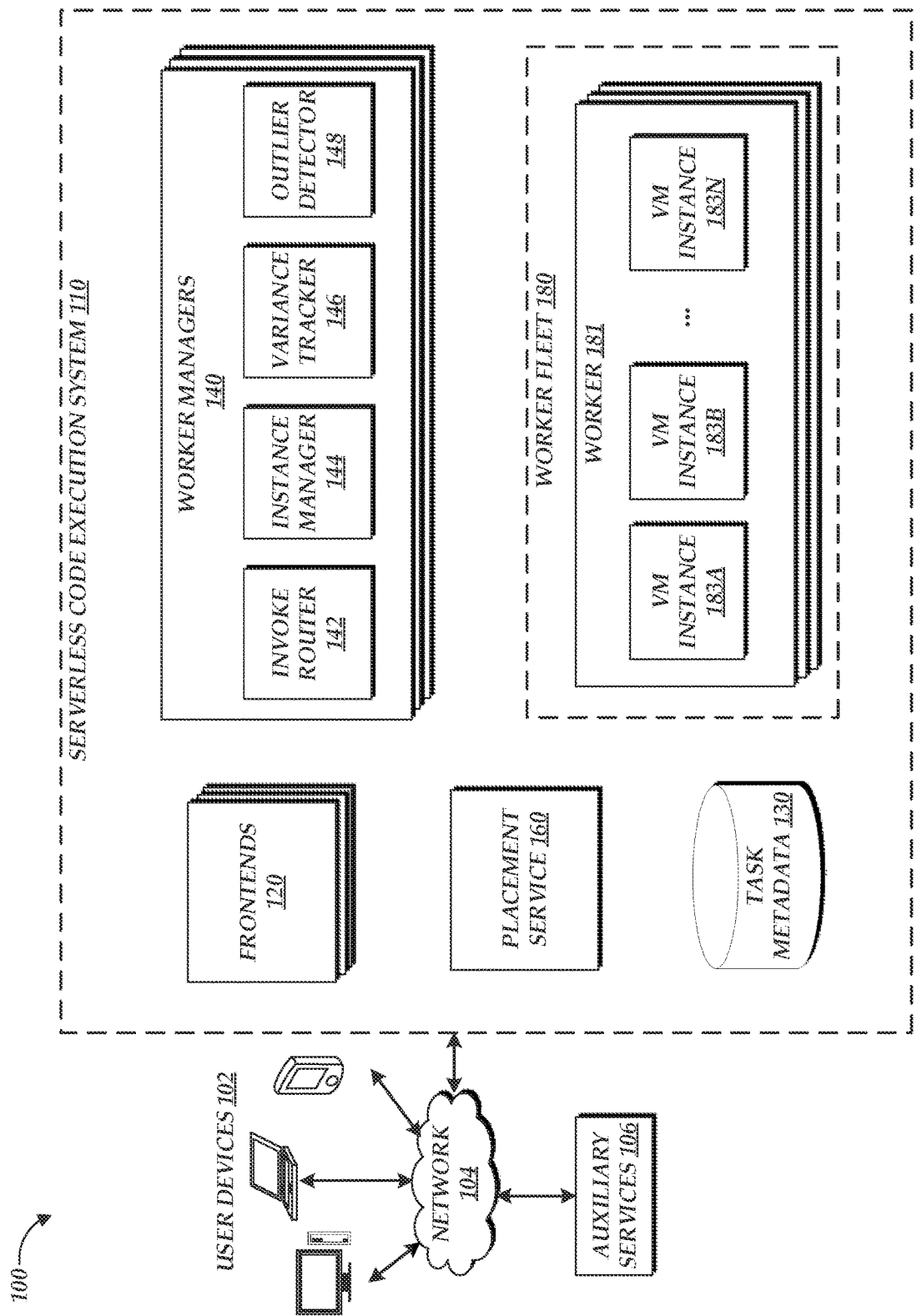
FIG. 2 is a block diagram depicting an illustrative environment in which a serverless code execution system can provide for reconfiguration of a pool of execution environments supporting execution of a task, including removal of environments with a performance distribution that varies significantly from an expected distribution.

FIG. 2 is a block diagram of an illustrative operating environment 100 for a serverless code execution system 110, in which client devices 102 may interact with the serverless code execution system 110 via a network 104.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programming interfaces (API), and/or other programmatic interfaces for generating and uploading user-executable source code (e.g., as part of a disk image), invoking the user-provided source code (e.g., submitting a request to execute the source code on the on-demand code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution environment 110 or otherwise communicate to the serverless code execution environment 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 2 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 2 as operating in a distributed computing environment including several computer systems that are interconnected using one or more computer networks (not shown in FIG. 2). The serverless code execution system 110 could also operate within a computing environment having a fewer or greater number of devices than are illustrated in FIG. 2. Thus, the depiction of the serverless code execution system 110 in FIG. 2 should be taken as illustrative and not limiting to the present disclosure. For example, the serverless code execution system 110 or various constituents thereof could implement various Web services components, hosted or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 2, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 2, users, by way of user computing devices 102, may interact with the serverless code execution system 110 to provide source code, and establish rules or logic defining when and how such code should be executed on the serverless code execution system 110, thus establishing a "task" or "function." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the on-demand code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may submit (e.g., to a frontend 120) for the task and associated data to be used to execute the task. In one embodiment, the code is provided in the form of a disk image containing the code and other data that the code may use during execution. Illustratively, creation of a task may result in the frontend 120 creating metadata for the task, which defines for example the user creating the task, the disk image used to facilitate execution of the task, trigger conditions for the task, and the like. In one embodiment, tasks may be versioned, with task metadata identifying the available versions and at least some other metadata for a task may vary across versions. For example, different versions may be associated with different disk images. Metadata is illustratively stored in the task metadata store 130. The task metadata store 130 correspond to any persistent data store. In one embodiment, the task metadata store 130 is implemented as logical storage on a cloud storage service, such as an object storage system. An example of such an object storage system is AMAZON™'s SIMPLE STORAGE SERVICE™ (or "S3™").

After a user has created a task on the serverless code execution system 110, the system 110 may accept calls to execute that task. To calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the serverless code execution system 110 may desire to limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). Alternatively or additionally, tasks may be triggered for execution at the serverless code execution system 110 based on data retrieved from one or more auxiliary services 106. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further includes an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A-N. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space on the worker 181, which logically partitions resources of the worker 181 among instances 183. Each user space may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 183 in a fully warmed state for all possible code executions, as executions may be associated with a wide variety of at least partially distinct data sets (e.g., disk images and/or snapshots). Thus, instances 183 may be maintained in a "greatest commonality" for a given group of tasks, such as being provisioned with a set of computing resources common to those tasks, being configured to accept an operating system type used by those tasks, etc.

On receiving instructions to provision an instance 183 to support execution of the task, the worker 181 may adjust the configuration of the instance 183 to support that execution. Specifically, the worker 181 may provision the instance 183 with access to a disk image or snapshot corresponding to the task. In some instances, the worker 181 may retrieve the disk image for the task and store the full image locally. In other instances, the worker 181 may provide to an instance 183 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020 and entitled "LOW LATENCY ACCESS TO DATA SETS USING SHARED DATA SET PORTIONS" (the "'250 Application") the entirety of which is hereby incorporated by reference.

In addition, the system 110 includes a number of components for facilitating distribution of calls to execute a task from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices—illustratively "lease" particular VM instances 183 within the fleet 180, thus gaining operational control to, for example, instruct virtual machine instances 183 to execute code of the task. Thus, on receiving a call to execute a task, a frontend 120 may distribute the call to a worker manager 140, which may identify a currently-leased VM instance 183 in which to implement the task, and cause the instance 183 to implement the task.

In the instance that a worker manager 140 does not currently lease a VM instance 183 corresponding to the called task, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a task) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, providing the instance 183 with access to a required set of data to support execution, etc.) thereafter grant to the worker manager 140 a lease to that instance 183, thus facilitating execution.

Turning to the worker managers 140 in more detail, the managers 140 are shown in FIG. 1 to include a variety of components, including an invoke router 142, instance manager 144, variance tracker 146, and outlier detector 148. The invoke router 142 illustratively represents code executable by the manager 140 to route invocation requests—e.g., requests to execute a function or task. On receiving an invocation request from a frontend 120, the invoke router 142 can determine whether the manager 140 is currently associated with a VM instance 183 that is available to execute the function. For example, the invoke router 142 (or another component of the manager 140, such as the instance manager 144) may maintain a list of instances 183 "leased" by the manager 140 and a task associated with each such instance 183 (e.g., indicating that the instance is provisioned with access with data required to execute the code, such as the code itself and any dependencies). When the invoke router 142 determines that an instance 183 is leased and available to execute a function (e.g., not currently executing another function or another instance of the invoked function)—a process sometimes referred to as a "warm invoke"—the router 142 can pass the invocation to the instance manager 144. The instance manager 144 can, in turn, instruct the instance 183 to execute the function. The instance manager 144 can further monitor a state of the execution, such as monitoring whether and when invocation completes and gathering metrics regarding the instance 183, such as CPU time required to complete the invocation. When the invoke router 142 determines that no instance 183 is leased and available to execute the function—a process sometimes referred to as a "cold invoke"—the invoke router 142 can interact with the placement service 160 to request a lease on a new execution environment. On receiving the lease, the invoke router 142 can then handle the invocation as it would otherwise handle a warm invoke.

In addition to the invoke router 142 and instance manager 144, the worker managers 140 shown in FIG. 1 include a variance tracker 146 and an outlier detector 148. The variance tracker 146 illustratively represents code executable by the manager 140 to monitor performance metrics of instances 183 leased to the manager 140, such as by generating distributions similar to those shown above in FIG. 1. The variance tracker 146 may aggregate metrics from multiple instances 183 (e.g., all instances 183 associated with execution of a given function) to determine an expected distribution of performance metrics for a task.

The outlier detect 148 may use information generated by the variance tracker 146 to identify outlier instances 183, whose performance metrics with respect to execution of a task vary significantly from the expected distribution of performance metrics for the task. For example, the outlier detector 148 may detect when a distribution of metrics for an individual instance 183 differs from the expected distribution by a threshold amount. In that case, the detector 148 may cause the underperforming instance 183 to be replaced within a pool of instances 183 associated with the function (e.g., the collection of instances 183 associated with the function). For example, the outlier detector 148 may call to the placement server 160 to obtain a new environment for the function, and on creation of that environment, replace the underperforming environment with the new environment. This replacement can cause subsequent invocations of the function to be directed to the new environment, as opposed to the underperforming environment. Accordingly, the variance in performance resulting from use of the underperforming environment can be eliminated.

Figure 3:
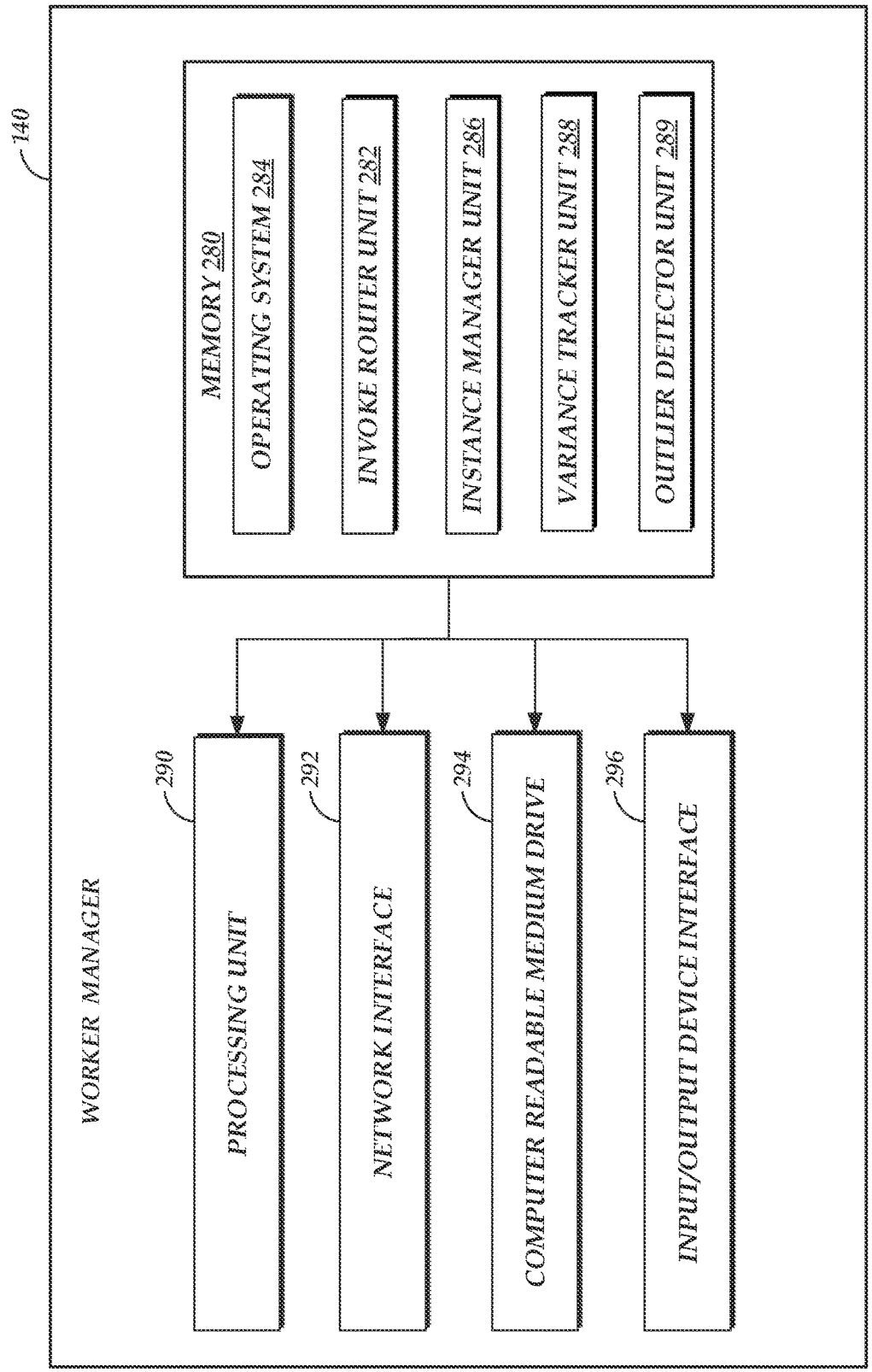
FIG. 3 depicts a general architecture of a computing device providing an worker manager of FIG. 1, which can analyze performance information of environments for a task to identify those with performance distributions that vary significantly from an expected distribution.

FIG. 3 depicts a general architecture of a computing system implementing a worker manager 140 of FIG. 1. The general architecture of the system depicted in FIG. 3 includes an arrangement of computer hardware and software that may be used to implement aspects of the present disclosure. The hardware may be implemented on physical electronic devices, as discussed in greater detail below. The system may include many more (or fewer) elements than those shown in FIG. 3. It is not necessary, however, that all of these elements be shown in order to provide an enabling disclosure. Additionally, the general architecture illustrated in FIG. 3 may be used to implement one or more of the other components illustrated in FIG. 2 (e.g., a worker 181, a frontend 120, etc.).

As illustrated, the system includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 3 as a single set of memory 280, memory 280 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes an invoke router unit 282 representing code executable to implement functionality of the invoke router 142, an instance manager unit 286 representing code executable to implement functionality of the instance manager 144, an variance tracker unit 288 representing code executable to implement functionality of the variance tracker 146, an invoke router unit 282 representing code executable to implement functionality of the outlier detector 148. In combination, the elements of the memory 280, when executed on the device 200, enable implementation of embodiments of the present disclosure.

The system of FIG. 3 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 3 as a worker manager 140, similar components may be utilized in some embodiments to implement other devices shown in the environment 100 of FIG. 2.

Figure 4:
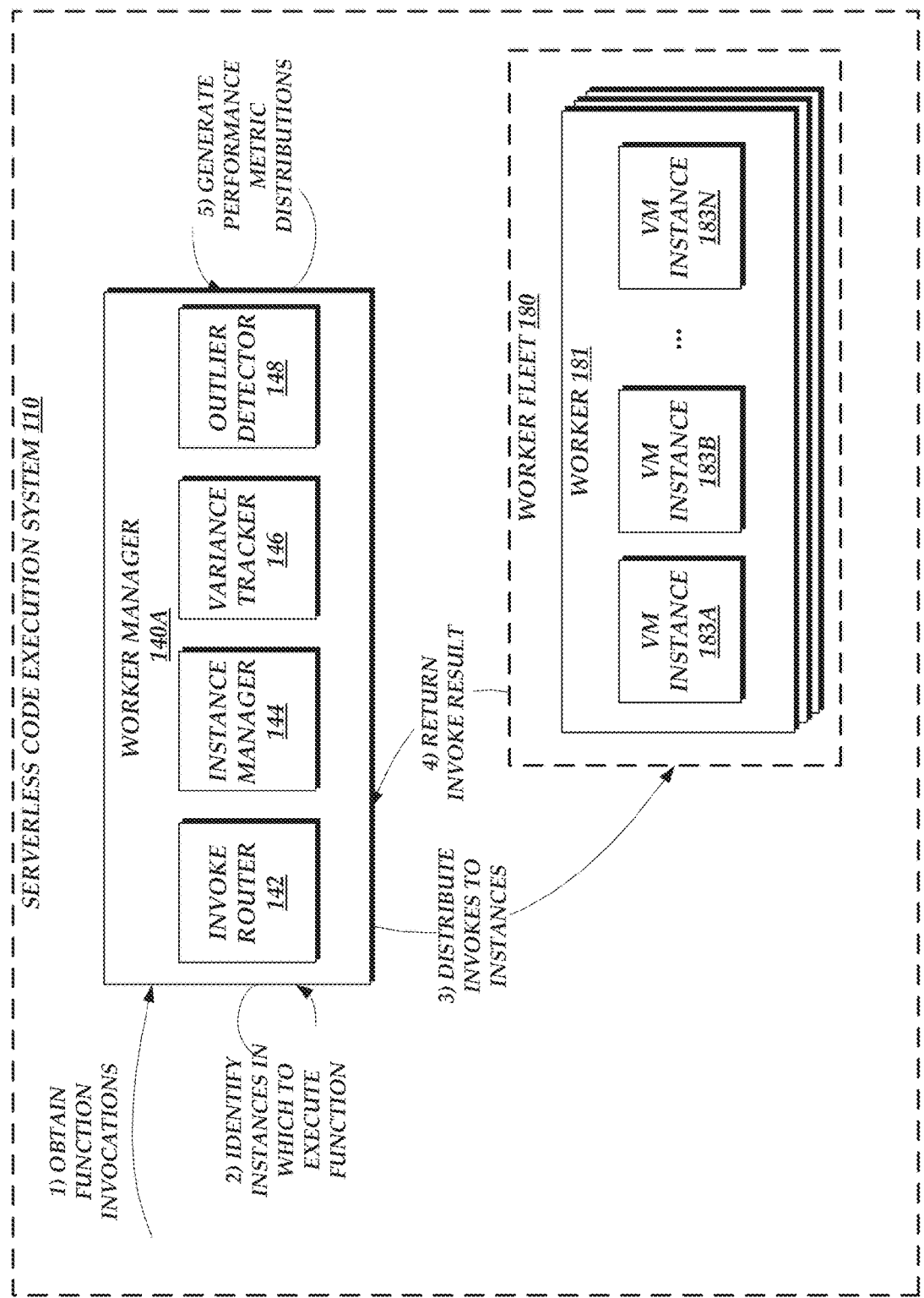
FIG. 4 is a flow diagram depicting illustrative interactions for determining an expected distribution of performance metrics for a task execution on a serverless code execution system.

With reference to FIG. 4, illustrative interactions are depicted for generating performance metrics for executions of a function execution on a serverless code execution system, including determining an expected distribution of performance metrics for the function. The interactions begin at (1), where a worker manager 140A obtains function invocations-instructions to invoke a function on the worker fleet 180. The function invocations are illustratively obtained by operation of a frontend 120 based on calls to invoke the function. The calls may be obtained from user devices 102, auxiliary services 106, generated at the serverless code execution system 110 based on pre-defined trigger conditions, etc., as described above.

At (2), the worker manager 140 (e.g., via operation of the invoke router 142) identifies instances 183 in which to execute the function. For example, the manager 140A may determine that an idle instance 183 associated with the function is leased by the manager 140A, and therefore identify the idle instance 183 as a target for distribution of the invocation. Alternatively, the manager 140A may determine that no idle instance 183 associated with the function exists, and therefore interact with the placement service 160 to obtain such an instance 183. Illustrative interactions for interaction with a placement service 160 are described in FIG. 5.

At (3), the manager 140A (e.g., via operation of the instance manager 144) then distributes the invocations to the identified instances 183, thus causing code of the function to be executed on the instances 183. The instances 183, subsequent to that execution, return an invocation result to the worker manager 140A at (4). The result may indicate, for example, success or failure of code execution.

At (5), the manager 140A (e.g., via operation of the variance tracker 146) generates performance metric distributions for the instances 183. Illustratively, the tracker 146 may determine a distribution of execution time for each instance 183, such as by referencing a "wall clock time" between sending an invocation and retrieving a result, or by reference data gathered at a worker 181 as to the total wall lock or CPU time required to execute the function. In some cases, it may be preferably to gather data at the manager 140A rather than a worker 181, as this may reflect variables such as network latency between the manager 140A and the worker 180 that the system 110 may desire to minimize. In other cases, the system 110 may be configured such that there is expected and allowable variation in latency. For example, workers 181 may be distributed across data centers or isolated "availability zones," and the system 110 may be configured such that this distribution should not be penalized. In such cases, it may be desirable to gather performance data at the worker 181, and report such data to the manager 140A, as opposed to gathering data at the manager 140. As noted above, the particular metric tracked may vary. In one embodiment, the distribution is generated based on time required for successful executions. The tracker 146 may additionally or alternatively track other metrics, such as a rate of successful executions relative to all executions.

In addition, at (5), the manager 140A can generate an expected performance distribution. The expected performance distribution may reflect, for example, aggregate performance metrics across all instances 183 associated with the function. As discussed below, these aggregate performance metrics may illustratively be used to determine whether performance metrics of an individual instance 183 underperform expectations significantly.

FIG. 4 depicts generation of performance metric distributions at the level of a worker manager 140. In some instances, performance metric distributions may be generated by other elements of the system 110, such as a centralized performance monitoring system. For example, some embodiments may distribute invocations of a single function among two worker managers 140, and use of a centralized performance monitoring system may enable aggregate performance metrics for the function to be determined based on all instances 183 associated with the function, regardless of which manager 140 manages the instance. In other instances, each worker manager 140 tracks performance of their respective instances 183, without aggregation between instances 183 associated with different managers 140.

Figure 5:
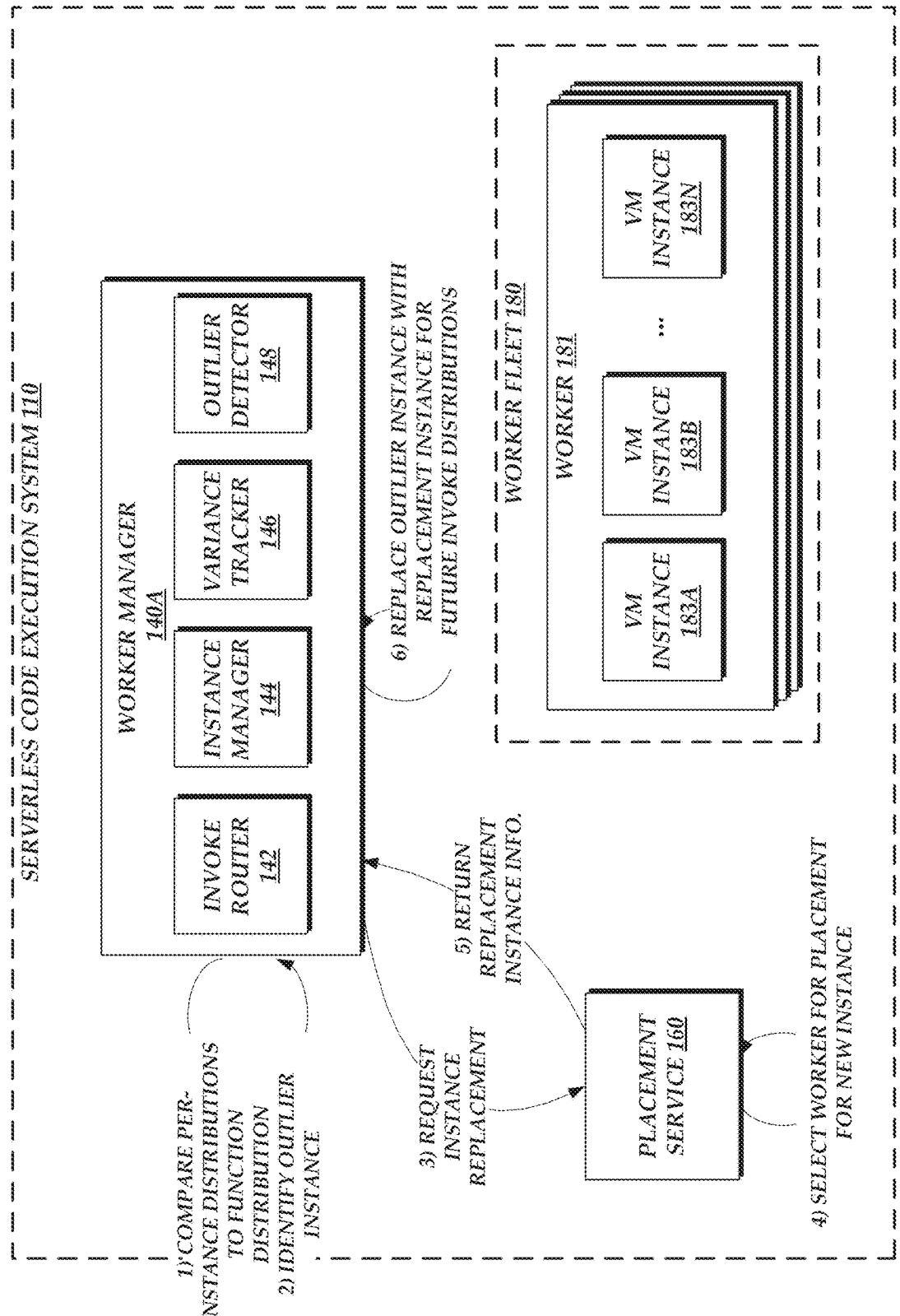
FIG. 5 is a flow diagram depicting illustrative interactions for identifying and replacing, in a pool of environments supporting execution of a task on a serverless code execution system, those environments with performance distributions that vary significantly from an expected distribution.

With reference to FIG. 5, illustrative interactions will be described for reconfiguration of a pool of instances 183 associated with a function to replace underperforming instances 183. The interactions of FIG. 5 may occur, for example, subsequently to those of FIG. 4.

The interactions begin at (1), where the worker manager 140A (e.g., via the outlier detector 148) compares per-instance performance distributions to an expected performance distribution for the function. As noted above, the expected distribution may be generated, for example, as an aggregate of per-instance distributions for the function.

At (2), the manager 140A identifies an outlier instance 183—one who's performance distribution differs significantly from the expected performance distribution. A variety of mechanisms known in the art can be used to compare distributions. For example, one mechanism for comparing distributions is Kullback-Leibler divergence, which measures how one distribution is different from another. Another similar measurement is the total variation distance. The manager 140A is illustratively configured with a threshold value, such that when one distribution differs from the expected performance by the threshold amount, it is flagged as significantly different. The threshold value may be static, or may be dynamic based on for example aggregate divergence from the expected distribution. In some instances, thresholds may be set according to aggregate divergence among multiple functions. For example, a clustering algorithm may be used to cluster functions into groups according, for example, to resource usage of the functions. Aggregate measurements for divergence of each function's per-instance distribution relative to the expected distribution for the function can then be used to establish a threshold divergence for functions within the cluster, which can be applied at (2). Thus, via analysis of the per-instance and expected performance metrics, the manager 140A can identify instances 183 in which a function execution typically underperforms, indicating potential issues with placement of the instance 183 on an underlying host.

At (3), the manager 140A transmits a request to the placement service 160 for a replacement instance 183—that is, a new instance 183 provisioned with data supporting execution of the function. The placement service 160, at (4), then selects a worker 181 on which to host the instances 183. In one embodiment, the worker 181 is selected in accordance with standard operation of the placement service 160. For example, the service 160 may employ a "best of k" selection algorithm, by inspecting a number (k) of workers 181 and selecting a "best" (e.g., least loaded) among them. In another embodiment, the service 160 may employ a modified placement algorithm, such as one that considers additional data or uses additional resources to make a placement decision that is expected to be more accurate than a standard placement algorithm. For example, the number k for replacement instances may be increased relative to the number k for other placement decisions. As noted above, an increase in the data and/or resources used to make replacement decisions may be warranted given that such placement is asynchronous with respect to requests to execute code.

After selecting a worker 181, the service 181 at (5) returns identifying information of an instance 183 on the worker 181 to the worker manager 140A. In some embodiments, the placement service 160 may interact with the worker 181 to establish the instance 181 prior to returning information to the worker manager 140A. In other instances, the placement service 160 may delegate creation of the instance 181 to the manager 140A, and as such may merely identify the worker 181 to the worker manager 140A as an indication that a new instance 183 is to be created on the worker 181.

At (6), the worker 140A then replaces, in the pool of instances associated with the function, the previously identified underperforming instance 183 with the replacement instance 183. As discussed above, the worker 140A can be configured to route invocations to an instance 183 within the pool. Accordingly, such invocations are effectively redirected away the underperforming instance 183 and to the replacement instance 183. Note that such redirection may not be exact—that is, it may not be that all invocations that would otherwise be directed to the underperforming instance 183 are instead directed to the replacement instance 183, as the worker 140A may employ a number of algorithms to select, on a per-invocation basis, an instance 183 from the pool associated with the function. However, by removal of the underperforming instance 183 from the pool, invocations are redirected away from that instance 183. Similarly, by addition of the new instance 183 to the pool, new invocations are direct to that instance. This process is referred to as "redirection" or "redistribution" from the underperforming instance 183 to the new instance 183 for simplicity.

Figure 6:
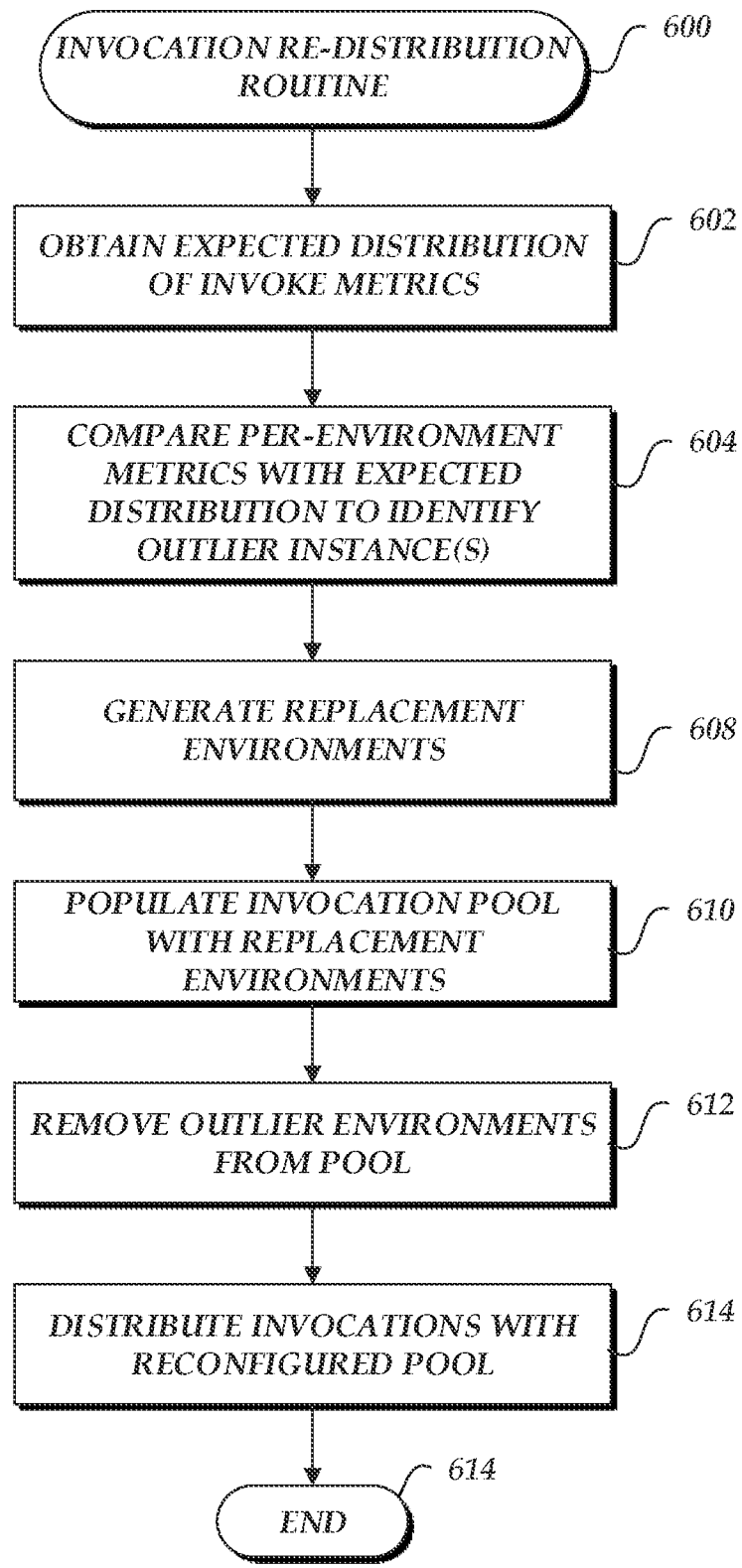
FIG. 6 is a flow chart depicting an illustrative routine for reconfiguration of a pool of execution environments supporting execution of a task on a serverless code execution system, including removal of environments with a performance distribution that varies significantly from an expected distributions.

FIG. 6 depicts an illustrative routine 600 for redistributing invocations away from an underperforming execution environment and to a replacement environment. The routine 600 may be implemented, for example, by a worker manager 140 of FIG. 1. For simplicity, the routine 600 is described with reference to a single function on a serverless compute system. In practice, the routine 600 may be implemented with respect to a wide variety of functions (e.g., as a single routine considering multiple functions, or as multiple instances of single-function routines).

The routine 600 begins at block 602, where the worker manager 140 obtains an expected distribution of invocation metrics for the function. For example, the expected distribution may reflect expected execution times for the function, or other measurements for performance of the function (e.g., CPU usage, memory usage, bandwidth usage, etc.). Examples of such distributions are shown in FIG. 1 and discussed above. One skilled in the art will appreciate that the example distributions of FIG. 1 are somewhat simplified, and more complex distributions may be employed in practice. For example, a distribution may reflect multiple performance metrics, such as both execution time and success rate. Alternatively, multiple distributions may be combined, such that a function that diverges from both (or a threshold number) of such distributions is considered to represent an underperforming environment. In some instances, data within a distribution may be adjusted to account for expected or predictable variation. For example, functions in some scenarios may exhibit diurnal patterns, such that functions operate more quickly during the day (e.g., due to conditions on the serverless code execution system or an external network object) than at night. In other instances, functions may exhibit event-driven patterns, such as the performance of a function being dependent on the number or type of parameters passed during an invocation of the function. An expected distribution for a function can therefore be adjusted to account for such expected or predictable variation. As discussed above, the expected distribution can be based on an aggregate of observed performance metrics for the function (e.g., gathered over a recent past period, such as the last week, 14 days, etc.).

At block 604, the worker manager 140 compares per-environment performance metric distributions to the expected distribution, to identify outlier instances whose performance distribution significantly differs from the expected distribution. For example, as discussed above, the manager 140 may determine the Kullback-Leibler divergence between the two distributions, to determine whether that divergence satisfies a threshold value. If so, the distribution can be identified as an outlier. Other mechanisms for comparing distributions are possible. For example, rather than comparing distributions directly, a manager 140 may in some cases determine one or more statistical aggregate metrics for the distribution, such as a mean value, median value, or standard deviation. These metrics may be used to compare distributions such that, for example, a distribution is identified as an outlier when the mean execution time and/or the standard deviation increases beyond a threshold. In still more embodiments, the manager 140 may use such statistical aggregate metrics in place of distributions. For example, an expected performance may be characterized in terms of statistical aggregate metrics (e.g., a mean execution time observed during a past period), and the same metric may be calculated on a per-environment basis. The statistical aggregate metric of each environment may then be compared to the expected performance in order to identify outliers. In some embodiments, moments of a distribution can be used as a statistical aggregate metric. For example, an environment may be identified as an outlier based on a moment (e.g., a central moment) of the environment's distribution differing from a corresponding moment of the function's aggregate distribution by a threshold amount. As is known in the art, a distribution has a variety of moments, including for example a first moment representing an expected value (or mean), a second moment representing variance, a third moment representing skewness, a fourth moment representing kurtosis, etc. Any moment may be used as a statistical aggregate metric. In some instances, multiple such metrics may be combined for determining outliers. For example, a distribution may be considered an outlier when at least m of the first n moments differ from corresponding per-moment threshold values.

At block 608, the worker manager 140 generates a replacement environment for each outlier environment. For example, the worker manager 140 may interact with a placement service 160 to identify a worker 181 onto which to place a new environment, and instruct the worker 181 to create the environment. As discussed above, the placement mechanism used to select a host for the new environment may in some cases be modified relative to placement mechanism that occur synchronously to invocations of functions.

At block 610, the worker manager 140 populates the invocation pool—the pool of environments supporting invocations of a function—with the new environments. For example, the worker 140 may maintain a list of environments associated with the function, and may modify the list to include the new environments. Similarly, at block 612, the manager 140 removes the outlier environments from the pool, such that future invocations are not routed to the outlier environments. Thereafter, at block 614, the manager 140 distributes invocations in accordance with the reconfigured pool, such that invocations are directed to the replacement environments and not the outlier environments. For example, the manager 140 may, for each invocation, identify a "first found" environment that is not currently executing the function, and distribute an invocation to that environment such that the desired code is executed. Notably, replacement of the outlier environment with a new environment can be expected not to interrupt execution of the serverless function, as such replacement does not necessarily require any active execution within the outlier environment to halt. Rather, replacement can cause new invocations to be directed away from the outlier environment. As such, detrimental effect associated, for example, with migration of active workloads between environment can be avoided.

Accordingly, by implementation of the routine 600, invocations can effectively be shifted from the outlier environment to the new environment. Because the new environment can be expected to achieve a standard performance (e.g., as indicated by the expected performance distribution), while the outlier environment was not achieving that performance, overall performance of function execution is increased. Moreover, variance in performance is decreased, providing a positive end user experience. Still further, because underperformance of an environment may be indicative of overloading on a host device, redirection of invocations from the underperforming environment to the new environment can result in better load balancing on the serverless system, increasing efficiency of operation.

One skilled in the art will appreciate that the routine 600 may be modified in a variety of ways. For example, the routine 600 may be modified to include a feedback mechanism between identification of underperforming environments and a placement mechanism used to initially select a host for such environments. Illustratively, details of host configurations for an underperforming environment may be provided to the placement service 160, such that new environments are less likely to be placed on such host configurations. In this manner, future placements may be modified to avoid problematic or potentially incompatible hosts. For example, where the serverless system contains hosts of two or more distinct hardware configurations, it may be that a function performs poorly on one such configuration. However, an initial placement mechanism may not take into account this poor performance, as it may be difficult to detect a priori. The routine 600 may therefore be modified to provide feedback indicating, for example, that underperforming environments occur on a first configuration rather than a second configuration. A placement mechanism for environments can then be modified to prevent or reduce placement of environments for the function on hosts of the first configuration, thereby increasing placement accuracy and reducing the possibility that future environments underperform.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A serverless code execution system comprising:
   physical worker computing devices hosting a pool of execution environments associated with a serverless function, wherein the serverless function represents code executable to implement functionality associated with the function; and
   a worker manager comprising a processor configured to route invocations of the serverless function among execution environments within the pool, wherein the worker manager is further configured to:
   obtain an expected performance distribution for the pool of execution environments, the expected performance distribution representing a statistical distribution of a performance metric generated based on aggregate performance metrics monitored on the pool of execution environments during execution of the serverless function;
   compare the expected performance distribution for the pool to performance distributions of individual environments, the performance distributions of individual environments reflecting a per-environment statistical distribution of the performance metric during execution of the serverless function within the individual environments, to identify an execution environment with a per-environment statistical distribution that differs from the expected performance distribution by at least a threshold amount, wherein each statistical distribution, including the expected performance distribution and the performance distributions of individual environments, represents a range of values for the performance metric according to multiple measurements of the performance metric over time and a frequency of values for the performance metric within the range, and wherein comparison of the expected performance distribution for the pool to performance distributions of individual environments comprises comparison of multiple values of the performance distributions of individual environments to multiple values of the expected distribution;

generate a new execution environment for the serverless function; and replace the identified execution environment in the pool with the new execution environment, to cause future invocations of the serverless function to be redirected from the identified execution environment to the new execution environment.

2. The serverless code execution system of claim 1, wherein an execution environment is at least one of a container providing operating-system-level virtualization or a virtual machine instance.

3. The serverless code execution system of claim 1, wherein the performance metric is execution time.

4. The serverless code execution system of claim 1, wherein to generate the new execution environment for the serverless function, the worker manager is configured to interact with a placement service that selects a physical worker computing device on which to host the new execution environment.

5. The serverless code execution system of claim 1, wherein the worker manager implements a synchronous placement algorithm for placing execution environments as an operation that is synchronous to invocation of the serverless function and an asynchronous placement algorithm for placing execution environments as an operation that is asynchronous to invocation of the serverless function, wherein the asynchronous placement algorithm includes additional processing relative to the synchronous placement algorithm, and wherein the physical worker computing device on which to host the new execution environment is selected according to the asynchronous placement algorithm.

6. The serverless execution system of claim 1, wherein the worker manager generates the new execution environment for the serverless function by selecting a physical worker computing device to host the new execution environment according to an asynchronous placement algorithm, wherein the asynchronous placement algorithm places execution environments as an operation that is asynchronous to an invocation of the serverless function, by selecting the physical worker computing device from among a subset of plurality of physical worker computing devises, wherein the serverless execution system is further configured to select a physical computing device to host the new execution environment according to a synchronous placement algorithm, wherein the synchronous placement algorithm places execution environments as an operation that is synchronous to invocation of the serverless function, and wherein the size of the subset used to conduct the asynchronous placement algorithm is increased relative to a size of the subset used to conduct the synchronous placement algorithm.

7. A computer-implemented method for reconfiguration of a pool of execution environments associated with a serverless function, wherein the pool is hosted among a plurality of physical worker computing devices, wherein the serverless function represents code executable to implement functionality associated with the function, the computer-implemented method comprising:

obtaining an expected performance distribution for the pool of execution environments, and wherein the expected performance distribution represents an expected performance of an execution environment during execution of the serverless function with respect to a performance metric;

comparing the expected performance distribution for the pool to performance distributions of individual environments, the performance distributions of individual environments reflecting a per-environment statistical distribution of the performance metric during execution of the serverless function within the individual environments, to identify an execution environment with a per-environment statistical distribution that differs from the expected performance distribution by at least a threshold amount, wherein each statistical distribution, including the expected performance distribution and the performance distributions of individual environments, represents a range of values for the performance metric according to multiple measurements of the performance metric over time and a frequency of values for the performance metric within the range, and wherein comparing the expected performance distribution for the pool to performance distributions of individual environments comprises comparing multiple values of the performance distributions of individual environments to multiple values of the expected distribution;

generating a new execution environment for the serverless function;

replacing the identified execution environment in the pool with the new execution environment; and routing future invocations of the serverless function according to the pool, to cause the future invocations of the serverless function to be redirected from the identified execution environment to the new execution environment.

8. The computer-implemented method of claim 7, wherein the performance metric is at least one of processing unit time, wall clock time, bandwidth use, or memory use.

9. The computer-implemented method of claim 7, wherein the expected performance distribution is calculated based on aggregate performance metrics monitored on the pool of execution environments during execution of the serverless function over a past period of time.

10. The computer-implemented method of claim 7, wherein the expected performance distribution is calculated based on aggregate performance metrics monitored on the pool of execution environments during execution of the serverless function adjusted for predicable variation in the monitored performance metrics.

11. The computer-implemented method of claim 7, wherein the expected performance distribution is calculated based on aggregate performance metrics monitored on the pool of execution environments during execution of a cluster of serverless functions selected as similar to the serverless function according to a cluster analysis.

12. The computer-implemented method of claim 7, wherein comparing the expected performance distribution for the pool to performance distributions of individual environments comprising calculating at least one of a Kullback-Leibler divergence or a total variation distance between the expected performance distribution for the pool and the performance distributions of individual environments.

13. One or more non-transitory computer-readable media comprising executable instructions for reconfiguration of a pool of execution environments associated with a serverless function, wherein the pool is hosted among a plurality of physical computing devices, wherein the serverless function represents code executable to implement functionality associated with the function, and wherein the instructions, when executed by a serverless code execution system, cause the serverless code execution system to:
- obtain an expected performance distribution metric for the pool of execution environments, the expected performance distribution representing a statistical distribution of a performance metric generated based on aggregate performance metrics monitored on the pool of execution environments during execution of the serverless function;
- compare the expected statistical performance metric for the pool to performance metrics of individual environments, the performance metrics of individual environments reflecting a per-environment statistical measurement of the performance metric during execution of the serverless function within the individual environments, to identify an execution environment with a per-environment statistical metric that differs from the expected statistical performance metric by at least a threshold amount, wherein each statistical distribution, including the expected performance distribution and the performance distributions of individual environments, represents a range of values for the performance metric according to multiple measurements of the performance metric over time and a frequency of values for the performance metric within the range, and wherein comparison of the expected performance distribution for the pool to performance distributions of individual environments comprises comparison of multiple values of the performance distributions of individual environments to multiple values of the expected distribution;
- generate a new execution environment for the serverless function;
- replace the identified execution environment in the pool with the new execution environment; and
- route future invocations of the serverless function according to the pool, to cause the future invocations of the serverless function to be redirected from the identified execution environment to the new execution environment.

14. The one or more non-transitory computer-readable media of claim 13, wherein to route the future invocations of the serverless function according to the pool, the instructions cause the serverless code execution system to select a first idle execution environment from the pool.

15. The one or more non-transitory computer-readable media of claim 13, wherein the instructions further cause the serverless code execution system to modify a synchronous placement algorithm, that places execution environments on physical computing devices as an operation that is synchronous to invocation of the serverless function, to bias against placement of the execution environments on physical computing devices similar to a physical computing device hosting the identified execution environment.

16. The one or more non-transitory computer-readable media of claim 15, wherein the physical computing devices similar to the physical computing device hosting the identified execution environment are physical computing devices with a hardware configuration of the physical computing device hosting the identified execution environment.

17. The one or more non-transitory computer-readable media of claim 13, wherein to generate the new execution environment for the serverless function, the instructions cause the serverless code execution system to select a physical computing device to host the new execution environment according to an asynchronous placement algorithm, wherein the asynchronous placement algorithm places execution environments as an operation that is asynchronous to invocation of the serverless function, wherein the serverless code execution system is further configured to select a physical computing devices to host the new execution environment according to a synchronous placement algorithm, wherein the synchronous placement algorithm places execution environments as an operation that is synchronous to invocation of the serverless function, and wherein the asynchronous placement algorithm includes additional processing relative to the synchronous placement algorithm that places execution environments as an operation that is synchronous to invocation of the serverless function.

18. The one or more non-transitory computer-readable media of claim 17, wherein the asynchronous placement algorithm places execution environments by selecting the physical computing device from among a subset of the plurality of physical computing devices, and wherein the additional processing corresponds to an increase in the size of the subset relative to a size of a subset of the plurality of physical computing devices used to conduct the synchronous placement algorithm.

19. The one or more non-transitory computer-readable media of claim 13, wherein the expected statistical performance metric represents at least one of a mean value of a first performance metric, a median value of the first performance metric, a standard deviation of the first performance metric, a distribution of the first performance metric, or a moment of the distribution of the first performance metric.

20. The one or more non-transitory computer-readable media of claim 13, wherein pool of execution environments associated with the serverless function is maintained as a list of execution environments on a routing device, and wherein replacing the identified execution environment in the pool with the new execution environment comprises adding the new execution environment to the list and removing the identified execution environment from the list.

* * * * *

UNITED STATES PATENT AND TRADEMARK OFFICE
CERTIFICATE OF CORRECTION

| | | |
|---|---|---|
| PATENT NO. | : 12,360,817 B1 | Page 1 of 1 |
| APPLICATION NO. | : 17/306751 | |
| DATED | : July 15, 2025 | |
| INVENTOR(S) | : Mihir Sathe | |

It is certified that error appears in the above-identified patent and that said Letters Patent is hereby corrected as shown below:

In the Claims

In Column 23, Claim 6, Line 45, delete "serverless execution system" and insert --serverless code execution system--.

Signed and Sealed this
Twenty-first Day of October, 2025

John A. Squires
*Director of the United States Patent and Trademark Office*